June 6, 1933.  G. B. CASE ET AL  1,913,105
ARTICLE RETAINING CONTAINER
Filed Oct. 12, 1931
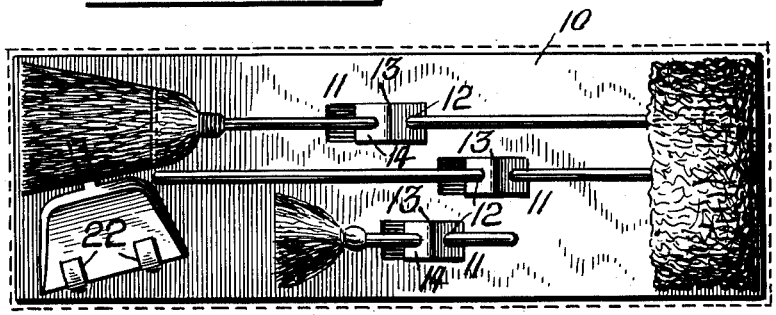
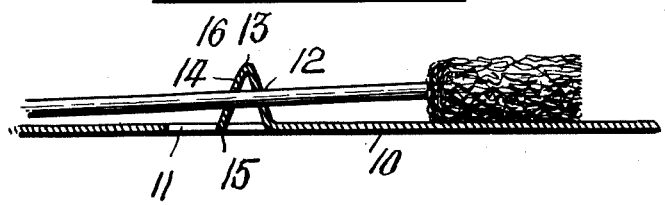
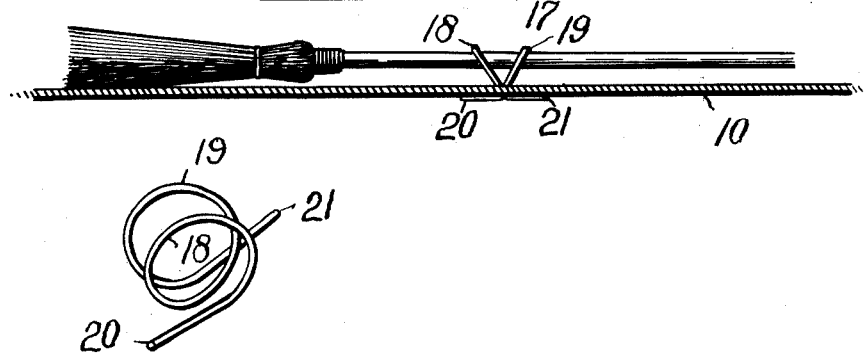
INVENTORS.
George B. Case &
Peter J. Salmon.
By J.B.M. Girr.
Attorney.

Patented June 6, 1933

1,913,105

UNITED STATES PATENT OFFICE

GEORGE BALAND CASE, OF BROOKLYN, AND PETER J. SALMON, OF ST. ALBANS, NEW YORK, ASSIGNORS TO THE INDUSTRIAL HOME FOR THE BLIND, OF BROOKLYN, NEW YORK, A CORPORATION OF NEW YORK

ARTICLE-RETAINING CONTAINER

Application filed October 12, 1931. Serial No. 568,302.

Our invention relates to means for holding into compact and neat position miniature household implements, into a suitable container, yet provided with simple ready means so that such articles may be readily attached or detached at will. Such means may comprise a part of a baseboard to which the articles are attached. After replacement of the articles on the base, the same may be placed in the container.

The prime object of our invention is to provide a new, yet simple, inexpensive and effective means for applying various implements of household use in a locked position to a base, that is placed within a container, yet be able to remove or attach these several implements in their proper position without any trouble, from the simple yet effective fastening.

The invention will be better understood from the following description, taken in connection with the accompanying drawing, wherein is shown what is now considered the preferred form. While the drawing illustrates only an example of means for putting our invention into practice, its scope will be pointed out in the specification and in the appended claims.

Further objects and advantages will become apparent as the description of the invention is hereinafter developed.

In the drawing, Fig. 1 shows the several implements of household held in position by a clip formed from the base; Fig. 2 is an enlarged sectional view through the clip showing the handle of the mop held secure thereto; Fig. 3 is a like view showing the board with a spring wire clip holding the handle of a broom secure to the board, and Fig. 4 is a detached view of the retainer shown in Fig. 3.

Miniature sets of household cleaning implements are very much in vogue by reason of the desire for smaller apartments for very light housekeeping. One of these sets has been found to meet every requirement under such circumstances, and yet when the same has been used it may be returned to the container and placed away for future use.

Again, the sets may be used as a kiddie set, so as to get the youth interested and anxious to do her share of the work about the apartment without the exertion of wielding the large clumsy implements as used generally.

Referring now to Fig. 1, the base board 10, has at suitable places a plurality of cut outs 11 that may be perforated at 12 of suitable diameter to permit the handle of the particular implement to be held therein. The cut out to be previously scored for the purpose of being easily bent at 13 upwards and then downwardly as at 14, thus bringing the perforations 12 into horizontal alignment with each other, and with the length of the base board. By reason of the end wall 15 being free, it naturally forms a spring wedging lock after the handle has been placed therein. The cut outs when bent into proper shape form an inverted V-shaped clip 16, the sides of the said clip being disposed angularly with respect to each other to the base board.

Fig. 3 shows a modified form of clip 17, comprising a spring wire bent so as to form two loops 18—19 and having their respective free ends 20—21 straightened so as to be attached to the base board by pulling the ends of the wire through small perforations in the base board. The spring loops are spread apart at their upper part so as to form a spring lock, which, to extract the handle, said loops will have to be pressed towards each other before the handle may be removed. It will be readily seen that after the handle of the various implements has been placed within these coils that they will be held secure from any movement whatsoever.

Our kit of household implements after being assembled in position on the base board, the said assembling is put into a suitable container and the top lid of which suitably secured in place.

Again, our arrangement the kit may be made up of very serviceable articles for ready use, each being made substantial and of standard quality of material, only made in miniature form, while the present kit comprises a broom, dry duster map for the floor, a silk duster and a dustpan, yet these may be changed or added to as may be thought necessary from time to time. The set readily recommends itself to those who wish to curtail their labors and, as has been noted, the kiddies will readily take to these sets which will be educational as well as useful to them.

Only one modification has been illustrated but it will be understood that we have illustrated the most useful forms of those designed by us, yet we desire to have it understood that various other modifications may be made and that the invention may be carried out in other ways than that shown and described, not only for the particular purpose shown and described, but other uses that may be made of it, any and all such are intended to come within the scope of the claims.

What we claim as new and desire to protect by Letters Patent is:

1. Means for holding a plurality of articles in predetermined relationship comprising a backing member, a plurality of spaced clips cut out and raised from said member and bent to inverted V shape, one side of said V being connected to said backing member, each side of said V being perforated, and said perforations being in horizontal alignment, substantially as illustrated and described.

2. A one-piece article-retaining device comprising a base made from cardboard or like material, a one-piece two-sided clip cut out and raised from said base, the sides of said clip being disposed angularly with respect to each other and to said base, said clip being provided with perforations through which said article is adapted to extend, whereby the article may be retained in predetermined relationship on said device.

3. Means for holding a plurality of articles, such as a broom, dusting mop, silk duster, dust pan and the like, in predetermined relative position within a box comprising a cardboard or like backing, a plurality of cut-outs raised from said backing, and said cut-outs being perforated with the perforations in horizontal alignment, whereby the handles of said articles are adapted to be received in said perforations to securely retain the articles in proper place within said box.

4. A device of the character described comprising a base member, an integral inverted V-shaped projection thereon, said projection being perforated to receive the handle of a broom, duster or the like article, the vertex of said V being resilient, whereby the latter may be retained in predetermined position.

5. In combination with a receptacle and a plurality of relatively long-handled cleaning implements or the like, such as brooms, dust pans, mops or the like, one-piece V-shaped resilient means in said receptacle and integral therewith, each side of said V-shaped means being provided with a perforation and said perforations being disposed in alinement, said means being adapted to receive the handles of said implements or articles in encompassing and securing relationship in the said perforations thereof, whereby said implements are retained in predetermined relative position.

Signed at Brooklyn in the county of Kings and State of New York.

GEORGE BALAND CASE.
PETER J. SALMON.